(12) United States Patent
Ueda (10) Patent No.: US 8,190,589 B2
(45) Date of Patent: May 29, 2012

(54) SYSTEM AND METHOD FOR CONTROLLING ACCESS TO A DOCUMENT BEING EDITED

(75) Inventor: Hiroyuki Ueda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 616 days.

(21) Appl. No.: 12/134,436

(22) Filed: Jun. 6, 2008

(65) Prior Publication Data

US 2009/0138648 A1      May 28, 2009

(30) Foreign Application Priority Data

Nov. 28, 2007   (JP) .................................. 2007-307991

(51) Int. Cl.
    *G06F 17/30* (2006.01)
(52) U.S. Cl. ........................................................ 707/704
(58) Field of Classification Search .................. 707/687, 707/704
    See application file for complete search history.

(56) References Cited

U.S. PATENT DOCUMENTS

| 5,251,315 | A | * | 10/1993 | Wang | 1/1 |
| 6,185,563 | B1 | * | 2/2001 | Hino | 1/1 |
| 6,546,412 | B1 | * | 4/2003 | Kim et al. | 718/104 |
| 6,584,466 | B1 | * | 6/2003 | Serbinis et al. | 715/209 |
| 6,850,938 | B1 | * | 2/2005 | Sadjadi | 707/999.008 |
| 6,965,893 | B1 | * | 11/2005 | Chan et al. | 707/999.008 |
| 7,107,518 | B2 | * | 9/2006 | Ramaley et al. | 715/235 |
| 2006/0112100 | A1 | * | 5/2006 | Maeda et al. | 707/8 |

FOREIGN PATENT DOCUMENTS

| JP | 2002324063 | 11/2002 |
| JP | 2005242850 | 9/2005 |
| JP | 2007193549 | 8/2007 |

OTHER PUBLICATIONS

Machine translation of JP 2005-242850 A.*
Machine translation of JP 2002-324063 A.*
Machine translation of JP 2007-066200 A.*
Certified translation of JP 2002-324063 A.*
Certified translation of JP 2005-242850 A.*
Certified translation of JP 2007-066200 A.*
Japanese Notice of Grounds for Rejection and English translation thereof, issued on Mar. 9, 2010 corresponding to Japanese Application No. 2007-307991.

* cited by examiner

*Primary Examiner* — Cheryl Lewis
*Assistant Examiner* — Scott A Waldron
(74) *Attorney, Agent, or Firm* — Gesmer Updegrove LLP (57) ABSTRACT

A first updating unit updates the state of access control of the data to be edited set up in the memory to an exclusive state in response to an exclusion request to the data to be edited. A second updating unit updates the state of access control of the data to be edited set up in the memory to an exclusion removal standby state in response to an exclusion removal request to the data to be edited in which the state of access control is in the exclusive state. A third updating unit updates the state of access control to all data to be edited from the exclusion removal standby state to an exclusion removal state when the data to be edited in which the state of access control is updated.

7 Claims, 9 Drawing Sheets

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | EDITABLE | DOES NOT EXIST | - | 1 | S001 | - |
| DOCUMENT 2 | 002 | EDITABLE | DOES NOT EXIST | - | 1 | S002 | - |
| DOCUMENT 3 | 003 | EDITABLE | DOES NOT EXIST | - | 1 | S003 | - |
| DOCUMENT 4 | 004 | EDITABLE | DOES NOT EXIST | - | 1 | S004 | - |
| DOCUMENT 5 | 005 | EDITABLE | DOES NOT EXIST | - | 1 | S005 | - |

FIG. 4

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | EDITABLE | EXISTS | SPECIFICATION A REVISION | 1 | S001 | - |
| DOCUMENT 2 | 002 | EDITABLE | DOES NOT EXIST | - | 1 | S002 | - |
| DOCUMENT 3 | 003 | EDITABLE | EXISTS | SPECIFICATION A REVISION | 1 | S003 | - |
| DOCUMENT 4 | 004 | EDITABLE | EXISTS | SPECIFICATION A REVISION | 1 | S004 | - |
| DOCUMENT 5 | 005 | EDITABLE | DOES NOT EXIST | - | 1 | S005 | - |

EXAMPLE OF DATA SETTING OF RELATED DOCUMENT INFORMATION

| RELATED DOCUMENT NAME | DOCUMENT ID | AUTOMATIC CHECK-IN |
|---|---|---|
| SPECIFICATION A REVISION | 001, 003, 004 | TRUE |
| ... | ... | ... |
| ... | ... | ... |

FIG. 7

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | CHECKING OUT | EXISTS | SPECIFICATION A REVISION | 1 | S001 | - |
| DOCUMENT 2 | 002 | EDITABLE | DOES NOT EXIST | - | 1 | S002 | - |
| DOCUMENT 3 | 003 | CHECKING OUT | EXISTS | SPECIFICATION A REVISION | 1 | S003 | - |
| DOCUMENT 4 | 004 | CHECKING OUT | EXISTS | SPECIFICATION A REVISION | 1 | S004 | - |
| DOCUMENT 5 | 005 | EDITABLE | DOES NOT EXIST | - | 1 | S005 | - |

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | CHECKING OUT | EXISTS | SPECIFICATION A REVISION | 1 | S001 | - |
| DOCUMENT 2 | 002 | EDITABLE | DOES NOT EXIST | - | 1 | S002 | - |
| DOCUMENT 3 | 003 | CHECK-IN STANDBY | EXISTS | SPECIFICATION A REVISION | 1 | S003 | T003 |
| DOCUMENT 4 | 004 | CHECKING OUT | EXISTS | SPECIFICATION A REVISION | 1 | S004 | - |
| DOCUMENT 5 | 005 | EDITABLE | DOES NOT EXIST | - | 1 | S005 | - |

FIG. 10

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | CHECK-IN STANDBY | EXISTS | - | 1 | S001 | T001 |
| DOCUMENT 2 | 002 | EDITABLE | DOES NOT EXIST | - | 1 | S002 | - |
| DOCUMENT 3 | 003 | CHECK-IN STANDBY | EXISTS | - | 1 | S003 | T003 |
| DOCUMENT 4 | 004 | CHECK-IN STANDBY | EXISTS | - | 1 | S004 | T004 |
| DOCUMENT 5 | 005 | EDITABLE | DOES NOT EXIST | - | 1 | S005 | - |

FIG. 11

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | EDITABLE | DOES NOT EXIST | - | 2 | S001 | - |
| DOCUMENT 2 | 002 | EDITABLE | DOES NOT EXIST | - | 1 | S002 | - |
| DOCUMENT 3 | 003 | EDITABLE | DOES NOT EXIST | - | 2 | S003 | - |
| DOCUMENT 4 | 004 | EDITABLE | DOES NOT EXIST | - | 2 | S004 | - |
| DOCUMENT 5 | 005 | EDITABLE | DOES NOT EXIST | - | 1 | S005 | - |

FIG. 12

EXAMPLE OF DATA SETTING OF DOCUMENT INFORMATION

| DOCUMENT NAME | DOCUMENT ID | DOCUMENT STATE | RELATED DOCUMENT | RELATED DOCUMENT NAME | REVISION NUMBER | DOCUMENT STORAGE LOCATION INFORMATION | DOCUMENT TEMPORARY STORAGE LOCATION INFORMATION |
|---|---|---|---|---|---|---|---|
| DOCUMENT 1 | 001 | CHECKING OUT | EXISTS | - | 1 | S001 | - |
| DOCUMENT 2 | 002 | EDITABLE | DOES NOT EXIST | - | 1 | S002 | - |
| DOCUMENT 3 | 003 | CHECK-IN STANDBY | EXISTS | - | 1 | S003 | T003 |
| DOCUMENT 4 | 004 | CHECK-IN STANDBY | EXISTS | - | 1 | S004 | T004 |
| DOCUMENT 5 | 005 | EDITABLE | DOES NOT EXIST | - | 1 | S005 | - |

SYSTEM AND METHOD FOR CONTROLLING ACCESS TO A DOCUMENT BEING EDITED

CROSS-REFERENCE TO RELATED APPLICATIONS

This application is based on and claims priority under 35 USC 119 from Japanese Patent Application No. 2007-307991 filed on Nov. 28, 2007.

BACKGROUND

1. Technical Field

The present invention relates to a data processing device, a recording medium, and a data processing method.

2. Related Art

In a project, for example, documents in regard to a product such as specifications are often provided in multiple electronic document files (hereinafter, simply "document"). Even if there is only one document, the document is often constituted by multiple chapters. After completion of the product, the contents of the generated documents may require revision due to a specification change or the like. To prevent user access to the parts under editing (hereinafter, "editing parts") during the editing work of the documents involving the revision, the documents are exclusively controlled by checking out/checking in.

When revisions to multiple documents are needed due to a specification change or the like, editing work related to respective revisions of the documents is required. However, if the correlated multiple documents are individually set to an exclusive state for editing, and if the exclusive state is removed after individually reflecting the revised versions generated by the edit as formal versions, the documents in which the exclusive state is removed will be available even though the removed documents are not consistent with the documents being edited in the exclusive state. As a result, consistency cannot be ensured between the correlated data to be edited, if the state of access control of the data to be edited ("document" in the above example) is updated from an exclusive state to a non-exclusive state without considering the state of access control to other correlated data to be edited.

SUMMARY

According to an aspect of the invention, there is provided a data processing device including: an edit data information memory that stores state information indicative of a state of access control to the data to be edited and associated information indicating that the data to be edited are associated with other data to be edited, the information set up for each data edit block; a first updating unit that updates the state of access control of the data to be edited set up in the edit data information memory to an exclusive state in response to an exclusion request for the data to be edited; a second updating unit that updates the state of access control of the data to be edited set up in the edit data information memory to an exclusion removal standby state in response to an exclusion removal request for the data to be edited in which the state of access control is in the exclusive state; and a third updating unit that updates the state of access control to all data to be edited from the exclusion removal standby state to an exclusion removal state when the data to be edited in which the state of access control is updated by the second updating unit to the exclusion removal standby state are associated with other data to be edited, when the state of access control to all data to be edited including the other data to be edited associated with the data to be edited has entered the exclusion removal standby state after the second updating unit has updated the state of access control to the exclusion removal standby state.

BRIEF DESCRIPTION OF THE DRAWINGS

Exemplary embodiment of the present invention will be described in detail based on the following figures, wherein.

DETAILED DESCRIPTION

An exemplary embodiment of the present invention will now be described with reference to the figures. In the description of the exemplary embodiment, an electronic data file is set as a data edit block to be edited by the user. Therefore, the user reads out an electronic data file from a predetermined storage location and edits the electronic data file. In the exemplary embodiment, an example will be described in which an electronic document file (hereinafter, "document") serving as the electronic data file is edited.

Figure 1:
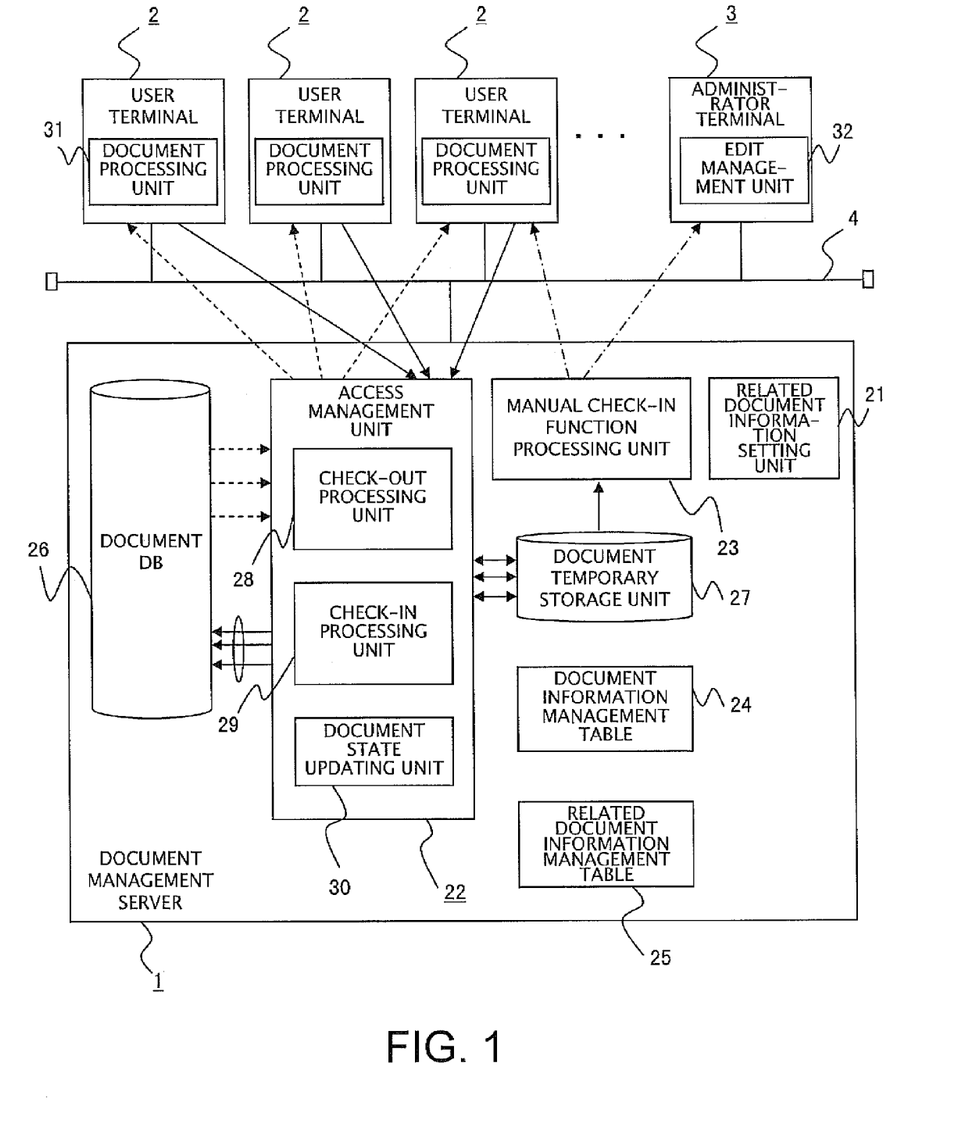
FIG. 1 shows an overall configuration and a block diagram of a document processing system including an exemplary embodiment of a data processing device according to the present invention.

FIG. 1 shows an overall configuration and a block diagram of a document processing system including an exemplary embodiment of a data processing device according to the present invention. FIG. 1 illustrates a configuration in which a document management server 1 equivalent to the data processing device of the present invention, user terminals 2 used by users of documents managed by the document management server 1, and an administrator terminal 3 used by an administrator of the document management server 1 are connected through a LAN (Local Area Network) 4 as one form of a network.

Figure 2:
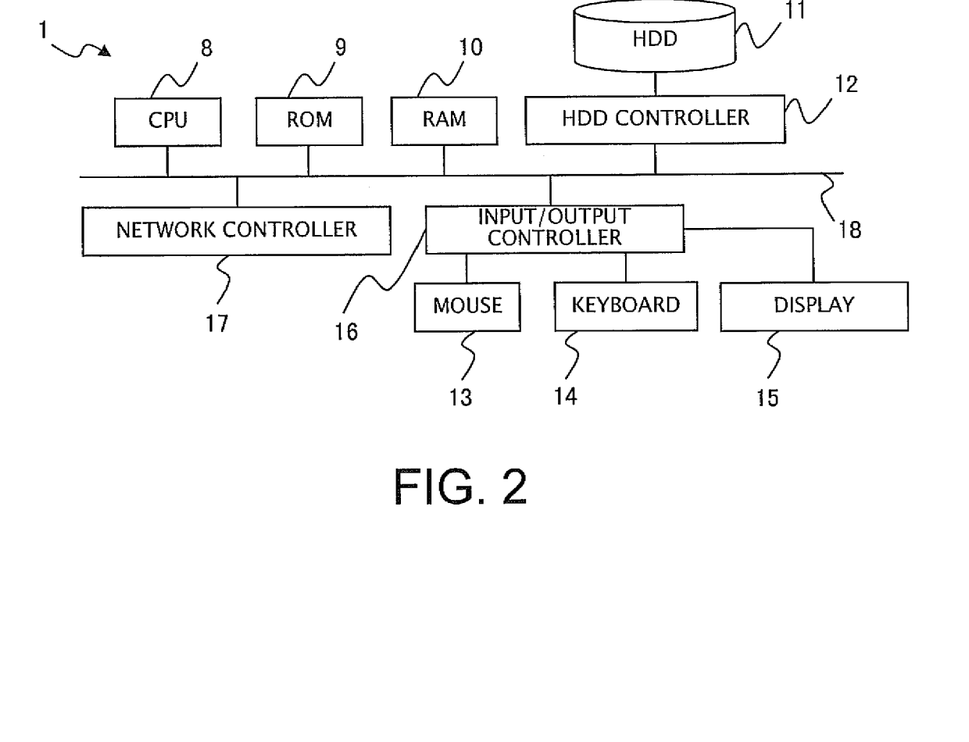
FIG. 2 is a hardware block diagram of a document management server in the exemplary embodiment.

FIG. 2 is a hardware block diagram of a server computer constituting the document management server 1 of the exemplary embodiment. The document management server 1 of the exemplary embodiment can be realized by an already-known universal hardware configuration. Specifically, as shown in FIG. 2, the document management server 1 is constituted by: a CPU 8; a ROM 9; a RAM 10; an HDD controller 12 connecting a hard disk drive (HDD) 11; an input/output controller 16 connecting a mouse 13 and a keyboard 14 provided as input units and a display 15 provided as a display device; and a network controller 17 provided as a communication unit, which are connected through an internal bus 18.

Although the performance may be different, the user terminals 2 and the administrator terminal 3 equivalent to client computers are also computers. Therefore, the hardware configurations can also be illustrated as shown in FIG. 2.

In FIG. 1, the document management server 1 includes a related document information setting unit 21, an access management unit 22, a manual check-in function processing unit 23, a document information management table 24, a related document information management table 25, a document database (DB) 26, and a document temporary storage unit 27. The related document information setting unit 21 sets information, which is related to related documents inputted by an administrator following a predetermined operation, to the document information management table 24 and the related document information management table 25. In the exemplary embodiment, each document belonging to a set of correlated documents is referred to as a "related document". The access management unit 22 performs overall management of the documents under control by storing the document management, including registering, updating, and deleting of documents as well as the exclusive control by checking out/checking in upon editing the documents in the document database 26. The access management unit 22 includes a check-out processing unit 28, a check-in processing unit 29, and a document state updating unit 30. The check-out processing unit 28 checks out a document when a user reads out and edits the document. The check-in processing unit 29 checks in the document when the user writes into the read-out document. In the exemplary embodiment, document states "editable", "checking out", and "check-in standby" are provided as states of access control to documents, which will be described below in detail. The document state updating unit 30 is provided as first to fourth updating units that update the document state of the document in accordance with the situation the document is in, in response to an instruction from the check-out processing unit 28 responding to an exclusion request from the user or an instruction from the check-in processing unit 29 responding to an exclusion removal request. In the present exemplary embodiment, methods of automatic check-in and manual check-in are implemented as check-in methods. The manual check-in function processing unit 23 executes processes related to the manual check-in. Checking out refers to an act of forming an exclusive state of data access from other users based on an instruction by the user. Checking in refers to an act of removing the exclusive state of data access and updating the data based on an instruction by the user.

Information related to documents stored and managed in the document database 26 is set up in the document information management table 24. Information in regard to the related documents is set up in the related document information management table 25. Details of the tables 24 and 25 will be further described below. The document database 26 stores the documents managed by the document management server 1. The document temporary storage unit 27 temporarily stores documents in the check-in standby state.

The constituent elements 21 to 23 of the document management server 1 are realized by the collaboration of a computer constituting the document management server 1 and a program running on the CPU 8 mounted on the computer. The document database 26 and the document temporary storage unit 27 are realized by the HDD 11. The document information management table 24 and the related document information management table 25 are realized by the RAM 10. The arrangement of the memories is not limited to this, and the document temporary storage unit 27 may be realized by the RAM 10 while the document information management table 24 and the related document information management table 25 are realized by the HDD 11.

The user terminal 2 includes a document processing unit 31 that edits the checked out document. The document processing unit 31 is realized by collaboration of a computer constituting a user terminal 2 and a document application running on the CPU 8 mounted on the computer. The document application can be realized by existing software. The administrator terminal 3 includes an edit management unit 32 that sets up information in regard to the related documents and that executes processes in regard to the manual check-in. The edit management unit 32 is realized by collaboration of a computer constituting the administrator terminal 3 and a browser running on the CPU 8 mounted on the computer.

The programs used in the exemplary embodiment can be provided by a communication unit, and can also be provided from a computer-readable recording medium such as a CD-ROM or a DVD-ROM storing the same. The programs provided by the communication unit or the recording medium are installed in the computer, and the CPU of the computer sequentially executes the installed programs to realize various processes.

In the exemplary embodiment, the state in regard to access control of the document to be edited changes by checking out/checking in. Checking out in the present exemplary embodiment refers to an act of forming an exclusive state of the document from other users in accordance with the user's instruction. Checking in refers to an act of removing the exclusive state of the document when the update of the document is completed. The states of the document and the transition of the states will be described with reference to FIG. 3.

Figure 3:
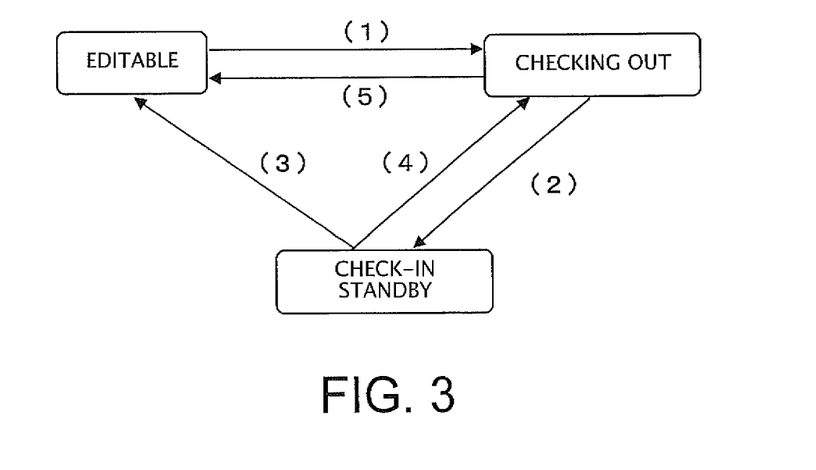
FIG. 3 is a schematic view illustrating states of a document and transitions of the states in the exemplary embodiment.

As described, in the exemplary embodiment the document states of access control to the documents include editable, checking out, and check-in standby. Editable refers to a state in which the access by a user is not rejected; in other words, a non-exclusive state, or a state in which the exclusion is removed. Checking out refers to an exclusive state formed by the user performing the check-out. Check-in standby refers to a state in which the user has instructed to check in but the check-in is actually on standby. The check-in standby may be considered to be included in the checking out in a broad sense since an exclusive state is maintained. However, the check-in standby is considered in a narrow sense in the exemplary embodiment, and the state in which the check-in is actually possible in accordance with the check-in instruction but the check-in is on standby is considered different from the exclusive state in the checking out.

In FIG. 3, reference numeral (1) denotes a transition when the user who edits the document instructs the check-out. Reference numeral (2) denotes a transition in a case where the user who has checked out the document instructs the check-in when the checked out document is defined as a related document. Reference numeral (3) denotes a transition when the administrator instructs simultaneous check-in. Reference numeral (4) denotes a transition when the administrator instructs removal of the check-in standby. Reference numeral (5) denotes a transition in a case where the user who has checked out the checked out document instructs the check-in when the checked out document is not defined as a related document. The simultaneous check-in indicates that checking in to all related documents is instructed.

Figure 4:
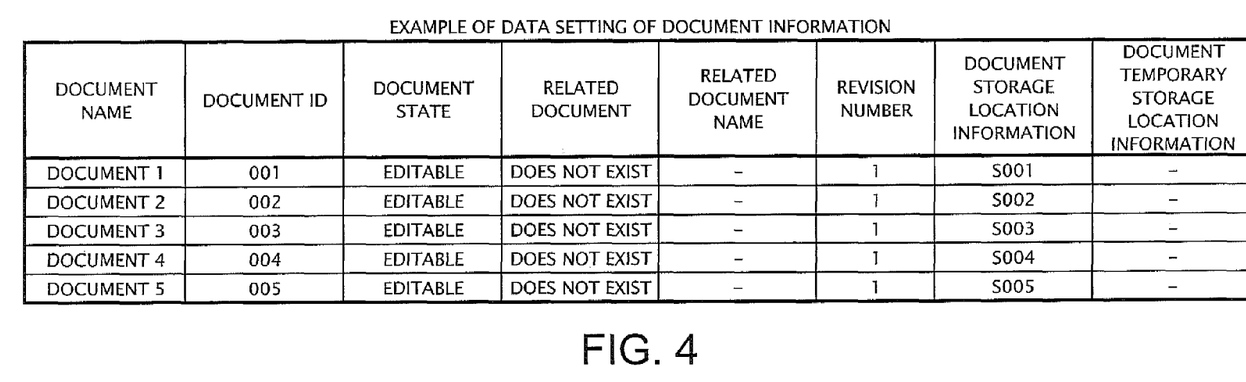
FIG. 4 illustrates an example of a data configuration of a document information management table in the exemplary embodiment.

FIG. 4 depicts an example of a data configuration of the document information management table 24 according to the exemplary embodiment. In the document information management table 24, the information items described above are associated with the documents stored in the document database 26. However, for convenience, only documents 1 to 5 are illustrated in FIG. 4. In the document information management table 24, information items such as document name, document ID, document state, related document, related document name, revision number, document storage location information, and document temporary storage location information are set up as necessary to each managed document. Among the information items, the document ID denotes information for identifying the document. The document state denotes the state of access control to the document at present, and one of "editable", "checking out", and "check-in standby" is set up. FIG. 4 illustrates an initial state, and none of the documents is checked out. Therefore, all documents are set up to "editable". The related document refers to flag information that indicates whether the document is set up as a related document, and "exists" is set up when the document is set up as a related document, whereas "does not exist" is set up when the document is not set up as a related document. FIG. 4 illustrates an initial state, and all documents are set up to "does not exist". The related document name denotes a name assigned for identifying the set of related documents when the document is set up as a related document. FIG. 4 illustrates an initial state, and nothing is set up to the documents. In the revision number, the version number of the document is set up. The document storage location information denotes information for specifying the storage location of the document. The document temporary storage location information denotes information for specifying the storage location of the document in the check-in standby state. The document storage location information and the document temporary storage location information are written with folder names, URLs (Uniform Resource Locator), or the like. The exemplary embodiment is designed to be set up with URLs.

An operation of the exemplary embodiment will now be described. To implement the exemplary embodiment, related documents need to be set up in advance. Thus, a registration process of information in regard to the related documents will be described first. For example, if changes are needed for multiple documents due to a specification change or the like, the documents requiring the changes are set up as related documents. An example will be described in which changes are needed for the documents 1, 3, and 4 due to revision, among the documents 1 to 5 constituting the specifications.

Figure 5:
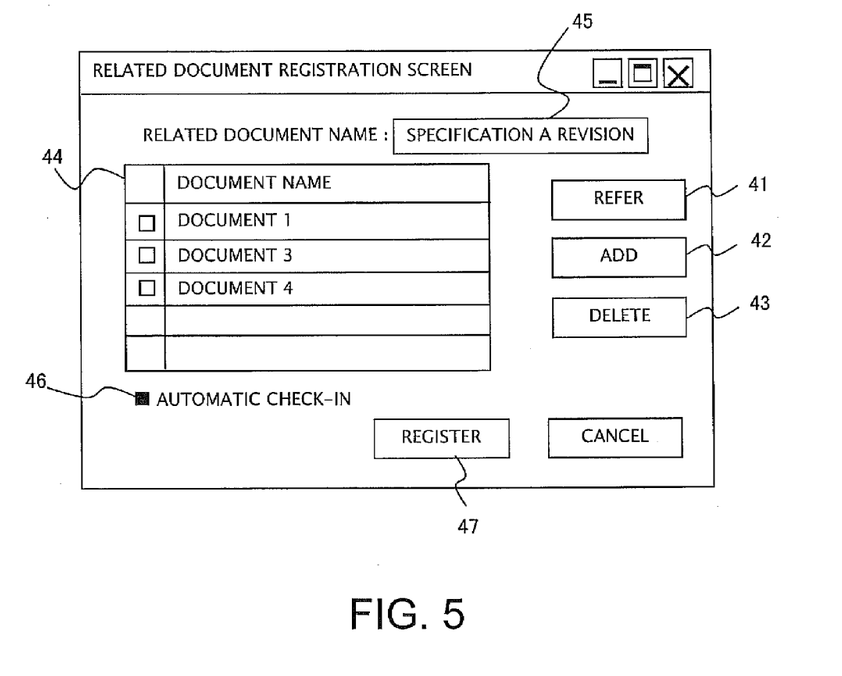
FIG. 5 illustrates an example of display of a related document registration screen in the exemplary embodiment.
Figure 6:
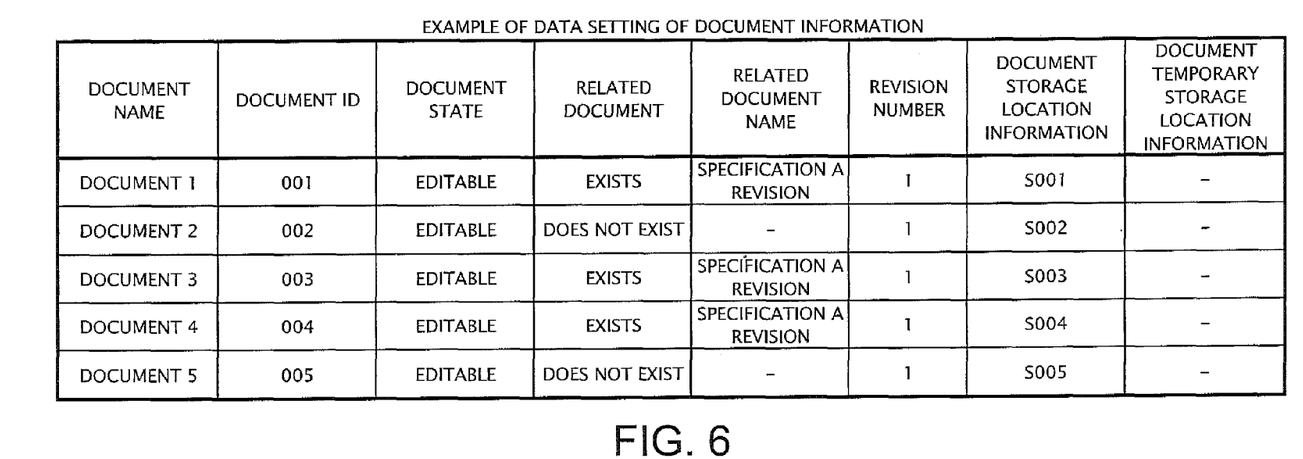
FIG. 6 illustrates an example of data setting of the document information management table after setting up information in regard to related documents in the exemplary embodiment.

In response to the related document information setting request from the administrator terminal 3, the related document information setting unit 21 causes the administrator terminal 3 to display the related document registration screen illustrated in FIG. 5. The administrator presses a reference button 41 of the related document registration screen shown on the display of the administrator terminal 3 to display a list of information of the documents stored in the document database 26; specifically, the document names. The administrator then selects document names to be registered as related documents and presses an addition button 42. The pressing refers to a selection operation of the button such as clicking with the mouse 13. As a result, the selected document name is added to a related document display area 44. FIG. 5 illustrates an example in which the documents 1, 3, and 4 are selected as related documents by the administrator's addition operation. If there is a document that the administrator desires to delete from the documents displayed on the related document display area 44, the administrator selects the document name in the related document display area 44 and then presses a deletion button 43. Consequently, the selected document name is erased from the related document display area 44 and removed from the set of the related documents. The administrator inputs this setting of the related documents as well as the related document names assigned to the related documents to a predetermined area 45. If the administrator desires automatic check-in, the administrator checks a check box 46. An example of the check box 46 being checked is illustrated in FIG. 5. After setting and inputting the information in regard to the related documents, the administrator presses a registration button 47. The related document information setting unit 21 accepts the information set and inputted by the administrator pressing the registration button 47. The setting of the information is registered to the document information management table 24 and the related document information management table 25. Examples of the set contents of the document information management table 24 and the related document information management table 25 after the registration of the setting are shown in FIGS. 6 and 7 respectively.

Figure 7:
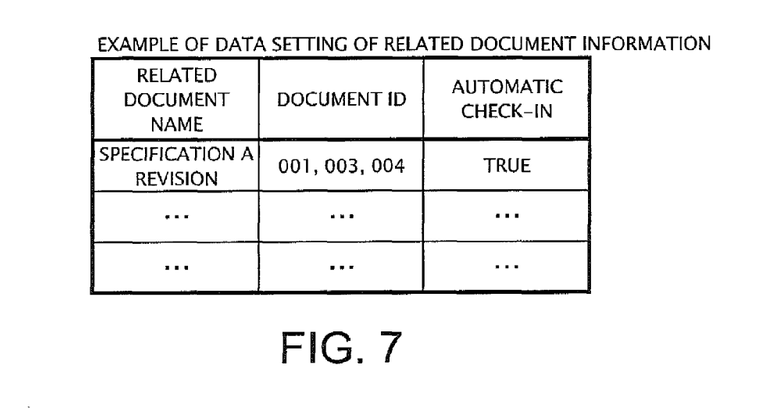
FIG. 7 illustrates an example of a data configuration of a related document information management table and an example of data setting after setting up information in regard to the related documents in the exemplary embodiment.

As illustrated in FIG. 7, the related document information management table 25 in the exemplary embodiment has a data configuration in which the related document names are associated with the document IDs of the documents corresponding to the related documents and true or false of the automatic check-in. In this case, the administrator has set up "Specification A Revision" as the related document name, the documents 1, 3, and 4 as the related documents, and the automatic check-in as the check-in method. Therefore, the related document information setting unit 21 associates "Specification A Revision" with the related document name, the document IDs "001", "003", and "004" of the documents 1, 3, and 4 with the related documents, and "True" indicative of implementation of the automatic check-in with the automatic check-in. The related document information setting unit 21 then registers the associations to the document information management table 24. Furthermore, the related document information setting unit 21 updates the related document of the documents 1, 3, and 4 set up as the related documents to "exists" in the document information management table 24 as shown in FIG. 6 and sets "Specification A Revision" to the related document name. The document information management table 24 may be set up first instead of setting up the document information management table 24 and the related document information management table 25 in the described order. In the exemplary embodiment, the information in regard to the related documents is set up in this manner.

Figure 8:
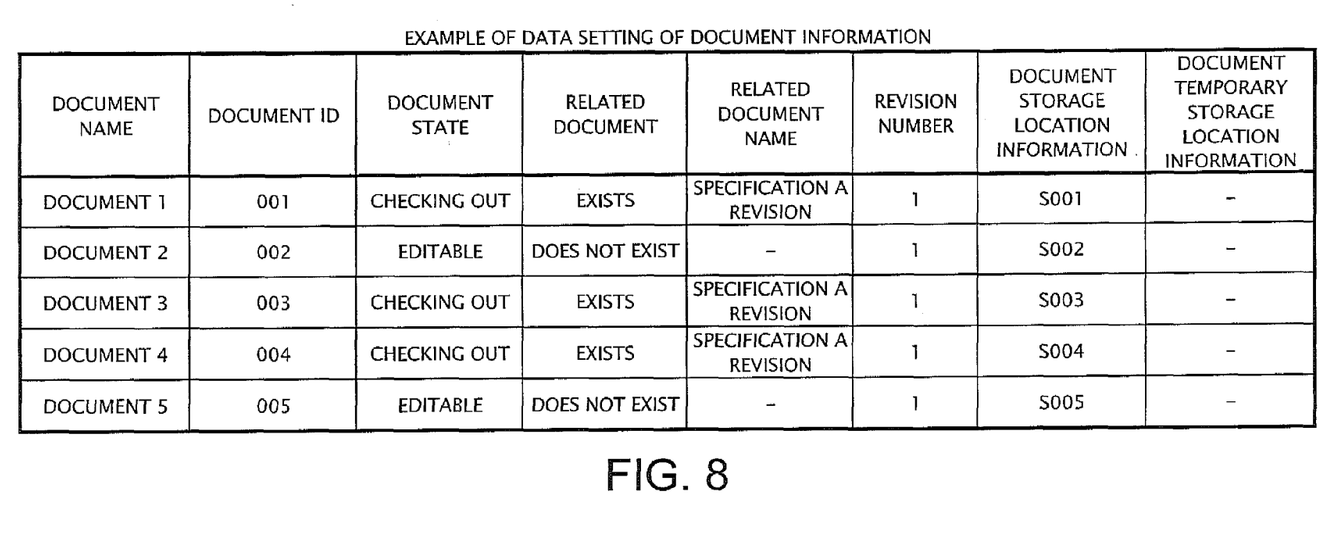
FIG. 8 illustrates an example of data setting of the document information management table after checking out in the exemplary embodiment.

Subsequently, any one of the users will read out the documents to be edited from the document management server 1 to edit the documents 1, 3, and 4. The check-out processing unit 28 in the access management unit 22 confirms that the documents are not checked out in response to the check-out request (exclusion request) from the user terminal 2, reads out the documents from the document database 26, and checks out and downloads the documents to the user terminal 2. The document information management table 24 may be designed to hold identification information of the user terminal 2, which will be a download location, so that the download location of the documents can be identified. At the same time, the document state updating unit 30 is caused to update the state of access control of the documents set up in the document information management table 24 to "checking out" indicative of an exclusive state. An example of data setting after all of the documents 1, 3, and 4 are checked out is illustrated in FIG. 8. As can be clearly seen by comparing FIGS. 6 and 8, the document state of the documents 1, 3, and 4 are changed from "editable" to "checking out". FIG. 1 illustrates a flow of the documents during the check-out with a broken line.

After the check-out is completed in this way, the user edits the documents 1, 3, and 4. The documents 1, 3, and 4 will be checked in after the edit. A process in regard to the check-in in the exemplary embodiment will be described with reference to a flow chart shown in FIG. 9.

Figure 9:
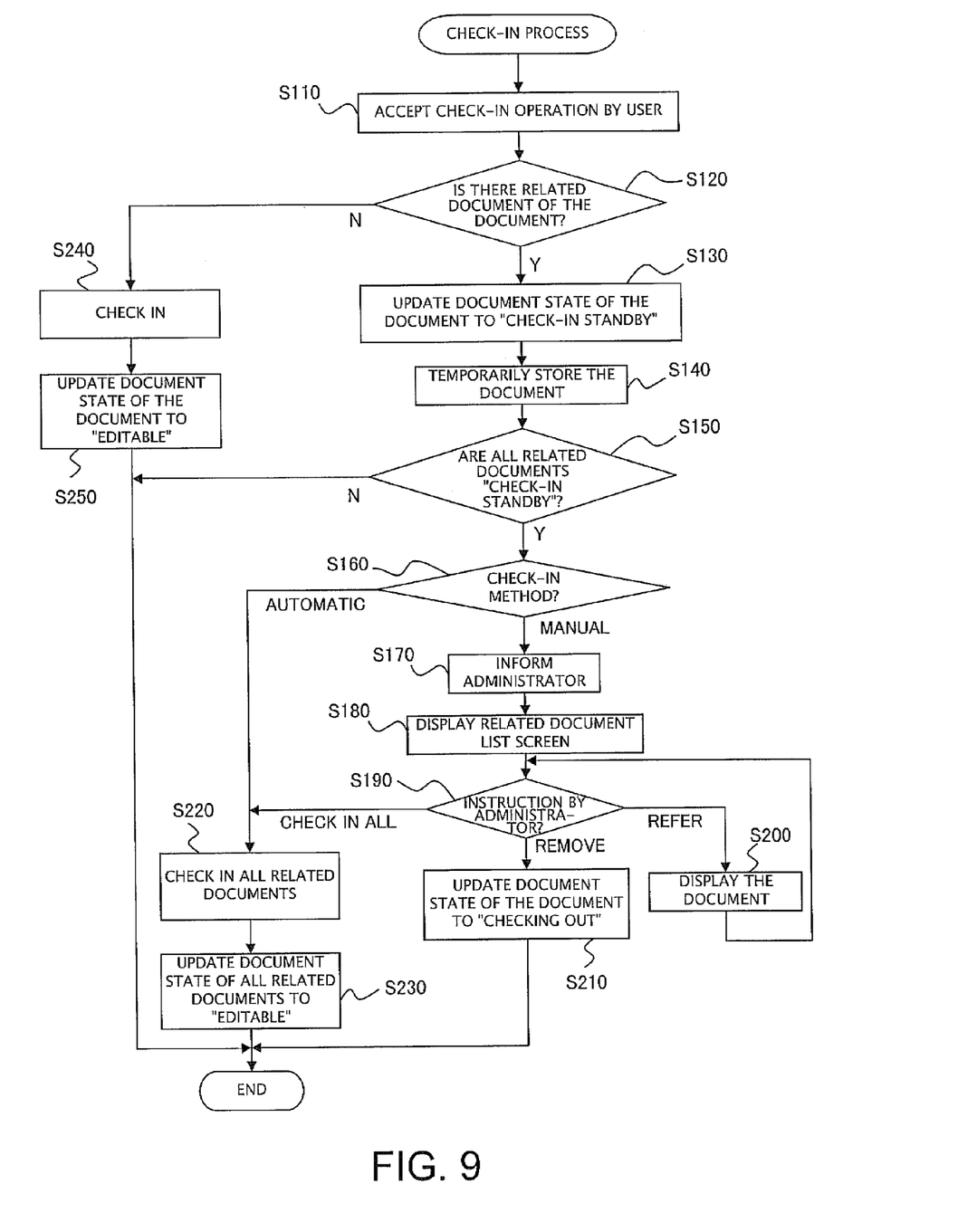
FIG. 9 is a flow chart illustrating a check-in process in the exemplary embodiment.

In response to transmission of a check-in request (exclusion removal request) from any of the user terminals 2, the access management unit 22 accepts the check-in request (step 110). The check-in processing unit 29 in the access management unit 22 refers to the item of the related document set up in the document information management table 24 to check whether the document requested for the check-in is a related document. If the document requested for the check-in is a document other than the documents 1, 3, and 4 and is not a related document (N in step 120), the check-in processing unit 29 updates the document database 26 with the document and checks in (step 240). At the same time, the check-in processing unit 29 causes the document state updating unit 30 to update the state of access control of the document set up in the document information management table 24 to "editable" indicative of a non-exclusive state (step 250).

Figure 10:
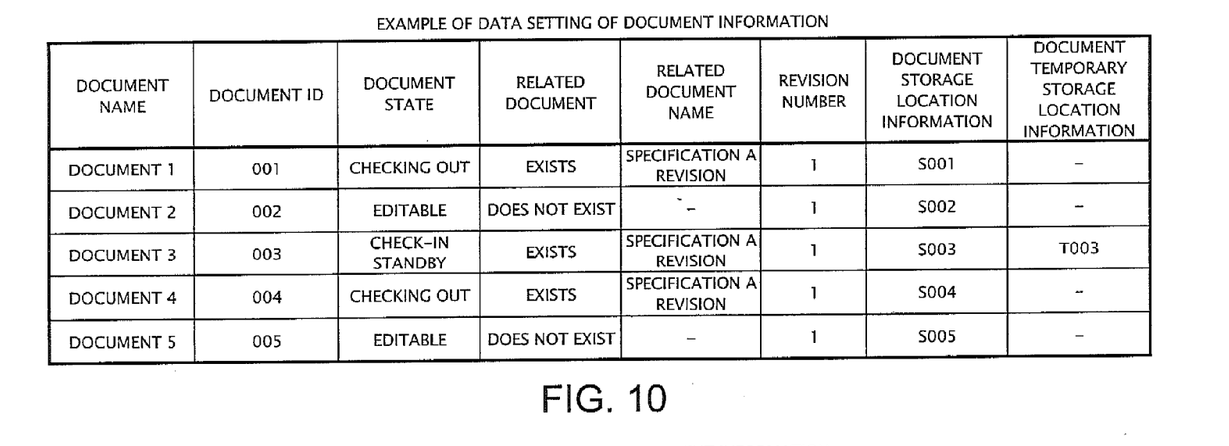
FIG. 10 illustrates an example of data setting of the document information management table when a document requested for checking in is in a check-in standby state in the exemplary embodiment.

Meanwhile, when confirming that the document requested for the check-in is a related document because the item of the related document set up in the document information management table 24 is "exists" (Y in step 120), the check-in processing unit 29 causes the document state updating unit 30 to update the state of access control of the document set up in the document information management table 24 to "check-in standby" indicative of an exclusion removal standby state (step 130). At the same time, the check-in processing unit 29 temporarily stores the document in the document temporary storage unit 27 (step 140). The check-in processing unit 29 then registers information indicative of the storage location of the document 1, such as a URL, to the document temporary storage location information associated with the document 1 in the document information management table 24. Describing under the assumption that the document 3 is the document requested for the check-in, FIG. 10 illustrates an example of setting the document information management table 24 when the document state of the document 3 is updated.

The documents related to the document 3 can be identified as the documents 1 and 4, because the related document name "Specification A Revision", the same as that of the document 3, is set up. However, all other documents 1 and 4 are not "check-in standby" (N in step 150), and therefore, the check-in processing unit 29 ends the present check-in process. The check-in processing unit 29 waits for the check-in request in a full-time reception waiting state. Thus, ending of the check-in process shifts the process to waiting for the reception of the next check-in request.

Subsequently, when a check-in request (exclusion removal request) of, for example, the document 1 is transmitted from any of the user terminals 2, the check-in processing unit 29 in the access management unit 22 refers to the item of the related document set up in the document information management table 24 and confirms that the document 1 is a related document (step 110, and Y in 120). The check-in processing unit 29 then causes the document state updating unit 30 to update the state of access control of the document 1 set up in the document information management table 24 to "check-in standby" (step 130). As described, the check-in processing unit 29 temporarily stores the document 1 in the document temporary storage unit 27 (step 140) and registers information indicative of the storage location of the document 1 to the document temporary storage location information associated with the document 1 of the document information management table 24. At this point, the document state of the document 4 among the documents 1, 3, and 4, which are related documents, is "checking out," and not all related documents are in the "check-in standby" yet (N in step 150). Therefore, the process is shifted to waiting for the reception of the next check-in request.

When a check-in request (exclusion removal request) of, for example, the document 4 is transmitted from any of the user terminals 2, the check-in processing unit 29 of the access management unit 22 refers to the item of the related document set up in the document information management table 24 and confirms that the document 4 is a related document (step 110, and Y in step 120). The check-in processing unit 29 then causes the document state updating unit 30 to update the state of access control of the document 1 set up in the document information management table 24 to "check-in standby" (step 130). As described, the check-in processing unit 29 temporarily stores the document 4 in the document temporary storage unit 27 (step 140) and registers information indicative of the storage location of the document 4 to the document temporary storage location information associated with the document 1 of the document information management table 24.

Figure 11:
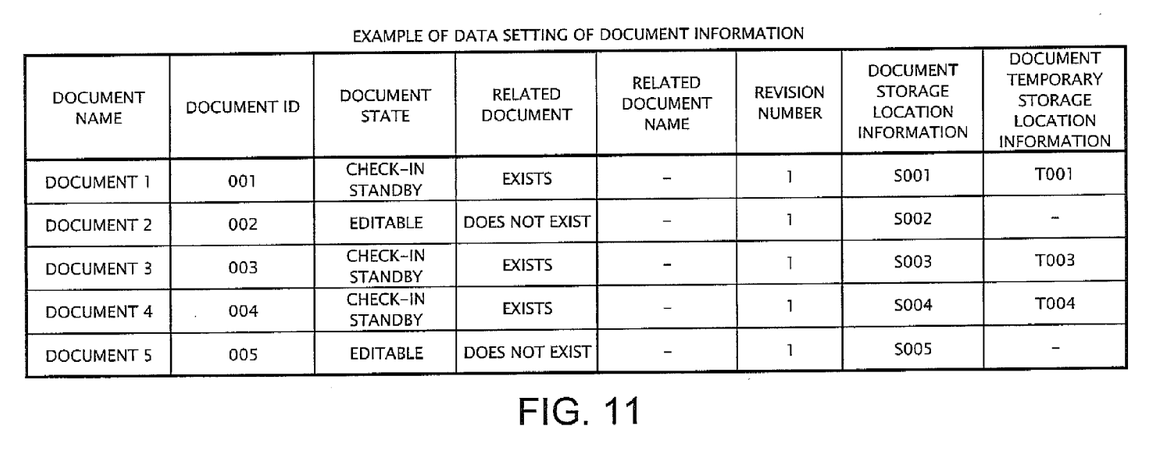
FIG. 11 illustrates an example of data setting of the document information management table when all related documents requested for checking in have entered a check-in standby state in the exemplary embodiment.
Figure 12:
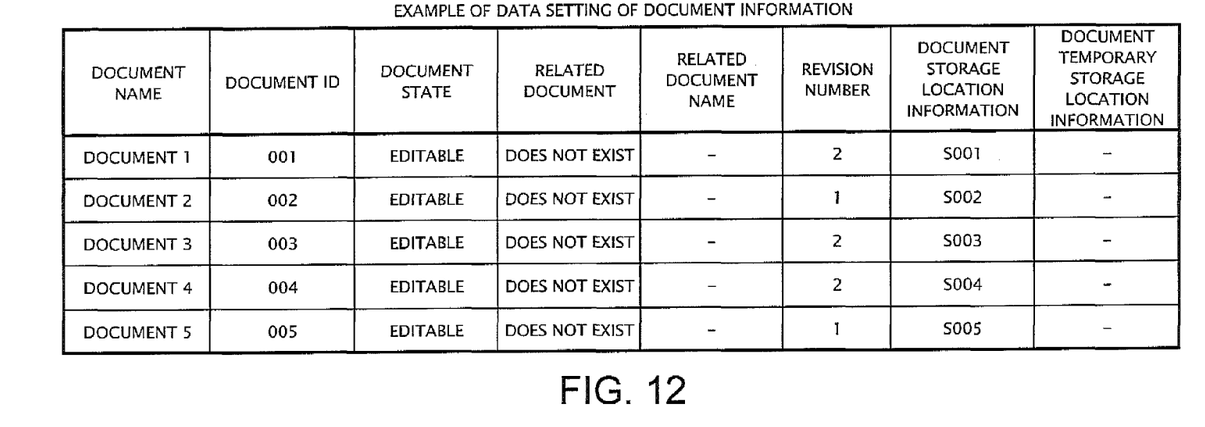
FIG. 12 illustrates an example of data setting of the document information management table after all related documents requested for checking in are checked in the exemplary embodiment.

It can be confirmed at this point that all of the documents 1, 3, and 4, which are related documents, are in the state of "check-in standby". FIG. 11 illustrates an example of the setting of the document information management table 24 when the document state of all of the documents 1, 3, and 4, which are related documents, is updated to "check-in standby". When the document state of all related documents has become "check-in standby" when the document state of the document 4 included in the related documents is updated to "check-in standby" (Y in step 150), the check-in processing unit 29 refers to the automatic check-in of the related document "Specification A Revision" set up in the related document information management table 25 and confirms the method of checking in. As illustrated in FIG. 7, if the automatic check-in is "True" ("automatic" in step 160), the check-in processing unit 29 extracts the documents 1, 3, and 4 from the document temporary storage unit 27 and simultaneously checks in all of the related documents 1, 3, and 4 (step 220). At the same time, the check-in processing unit 29 causes the document state updating unit 30 to update the state of access control of all of the related documents 1, 3, and 4 set up in the document information management table 24 to "editable" (step 230). FIG. 12 illustrates an example of the setting of the document information management table 24 when all document states of the documents 1, 3, and 4, which are related documents, are updated to "editable". Once the check-in of all associated documents 1, 3, and 4 is completed, the check-in processing unit 29 updates the revision numbers of the documents 1, 3, and 4. FIG. 1 illustrates a flow of the documents during the check-in with a broken line.

On the other hand, unlike the example of FIG. 7, when determining that the manual check-in is instructed since a check-in method as "False" is set up in the automatic check-in ("manual" in step 160), the check-in processing unit 29 instructs the manual check-in function processing unit 23 to perform a manual check-in process.

More specifically, in response to the instruction, the manual check-in function processing unit 23 informs the administrator that all documents 1, 3, and 4 included in the related document name "Specification A Revision" can be checked in (step 170). In particular, the notification may be transmitted by e-mail. The e-mail includes the notification and information for display on the related document list screen; specifically, the URL indicative of the storage locations of the HTML documents for display on the screen.

Figure 13:
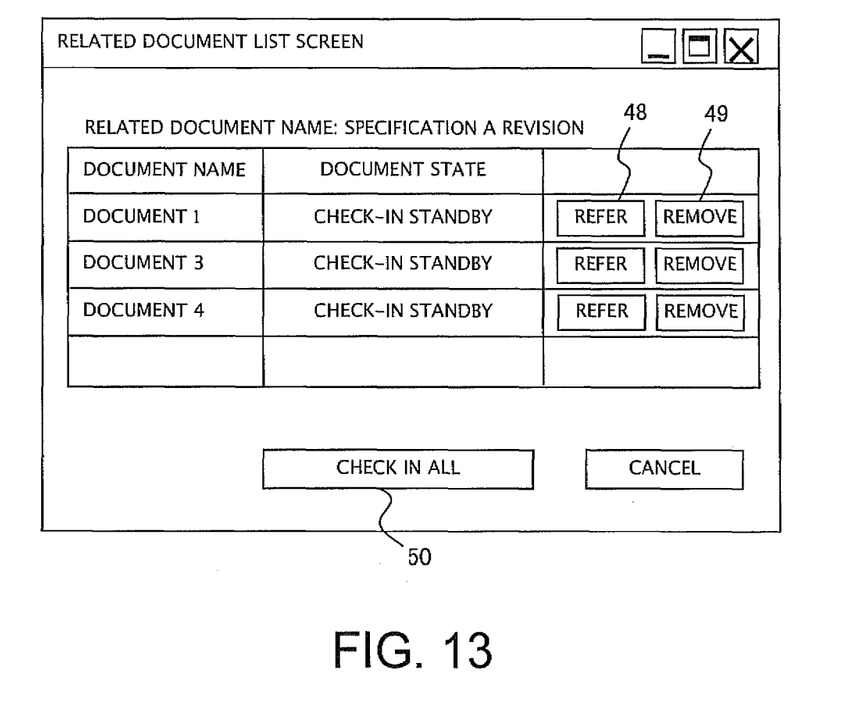
FIG. 13 illustrates an example of display of a related document list screen in the exemplary embodiment.
Figure 14:
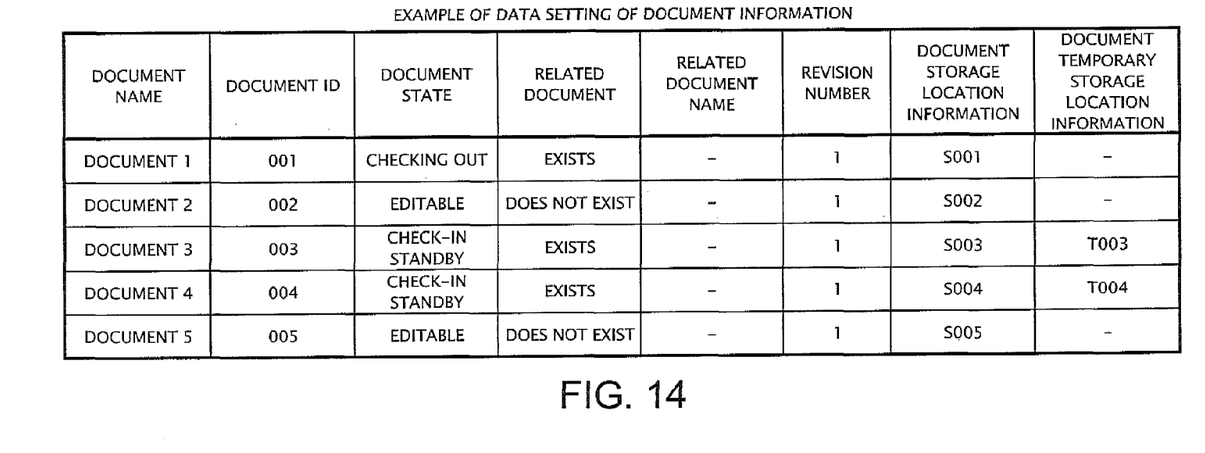
FIG. 14 illustrates an example of data setting of the document information management table after documents in the check-in standby state are instructed for removal in the exemplary embodiment.

FIG. 13 illustrates an example of the related document list screen displayed by the administrator receiving the notification by e-mail and clicking the URL designated by the e-mail. The related document name and the document states are displayed on the related document list screen. The document states are displayed at the document names of the documents associated as related documents. A reference button 48 and a removal button 49 are associated with each document and displayed on the screen. If the administrator instructs reference to the document 1 by clicking and selecting the reference button 48 associated with the document 1 ("refer" in step 190), the manual check-in function processing unit 23 reads out the document 1 from the document temporary storage unit 27 in response to the instruction and displays the document 1 on the administrator terminal 3 (step 200). The administrator then confirms the content edited in this way. For instance, when the administrator finds a deficiency such as erroneous writing in the edited document, the administrator instructs removal of the document 1 by clicking and selecting the removal button 49 associated with the document 1 ("remove" in step 190). In response to the instruction, the manual check-in function processing unit 23 causes the document state updating unit 30 to update the state of access control of the document 1 set up in the document information management table 24 to "checking out" (step 210). An example of the setting of the document information management table 24 at this point is illustrated in FIG. 14.

At the same time the manual check-in function processing unit 23 may inform the user terminal 2 used by the editor of the document 1 that the check-in request of the document 1 is removed. The removal notification may be transmitted by e-mail. The URL indicative of the storage location of the document 1 can be included in the e-mail in addition to the fact of the removal, and after receiving the removal notification, the user can click the URL whenever the user wants to edit the document 1. Not all related documents can be simultaneously checked in after the state of access control of the document 1 is updated to "checking out". Therefore, the check-in process is temporarily terminated. The process is then shifted to the next check-in process. FIG. 1 illustrates a flow of the document during the manual check-in with a dashed line.

The administrator presses all check-in buttons 50 when confirming the contents of the edited documents and determining that the related documents can be checked in. Consequently, the check-in processing unit 29 extracts the documents 1, 3, and 4 from the document temporary storage unit 27 and simultaneously checks in all of the documents 1, 3, and 4 (step 220). At the same time, the check-in processing unit 29 causes the document state updating unit 30 to update the state of access control of all documents 1, 3, and 4 set up in the document information management table 24 to "editable" (step 230). When the check-in of all associated documents 1, 3, and 4 is completed, the check-in processing unit 29 updates the revision numbers of the documents 1, 3, and 4.

In the exemplary embodiment, although an example of the electronic document file has been described as an example of the electronic data file, any data file form other than a document can be applied in the present invention so long as the file is editable, such as a drawing data file. Although an example has been described in which a data file serves as a data edit block, the present invention can be applied when one data file is constituted by multiple data edit blocks. In that case, a page or a record may serve as a data edit block, for example.

The administrator of the data to be edited denotes a user different from a mere editor of the data to be edited. The administrator of the data to be edited may be an administrator of a project or a system, and one or multiple administrators of the data to be edited may be appointed from among multiple editors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A data processing device comprising:
   an edit data information memory that stores state information indicative of a state of access control to a document to be edited and associated information indicating that the document to be edited is associated with other documents to be edited, the information set up for each document to be edited;
   a first updating unit that updates the state of access control of the document to be edited in the edit data information memory to an exclusive state in response to an exclusion request for the document to be edited;
   a second updating unit that updates the state of access control of the document to be edited in the edit data information memory from the exclusion removal request to an exclusion removal standby state when said edit data information memory includes associated information indicating that the document to be edited corresponding to the exclusion removal request is associated with other documents to be edited; and
   a third updating unit that updates the state of access control to all associated documents to be edited from the exclusion removal standby state to an exclusion removal state when the state information of the document to be edited in said edit data information memory indicates that the document to be edited corresponds to the exclusion removal standby request and the associated information indicates that all the associated documents to be edited correspond to an exclusion removal standby request.

2. The data processing device according to claim 1, further comprising an updating method information memory that stores, in each set of associated documents to be edited, updating method information provided with methods of updating the state of access control to all documents to be edited consisting the set to the exclusion removal state, wherein the third updating unit updates the state of access control to all documents to be edited from the exclusion removal standby state to the exclusion removal state in accordance with a method based on the content of the updating method information.

3. The data processing device according to claim 2, wherein the third updating unit updates the state of access control to all documents to be edited from the exclusion removal standby state to the exclusion removal state when the state of access control to all documents to be edited constituting the set becomes the exclusion removal standby state in accordance with the method based on the content of the updating method information.

4. The data processing device according to claim 2, further comprising an informing unit that informs an administrator of the document to be edited the fact that the state of access control to all documents to be edited consisting the set has entered the exclusion removal standby state, wherein the third updating unit updates the state of access control to all documents to be edited from the exclusion removal standby state to the exclusion removal state in response to an exclusion removal request from the administrator of the document to be edited in accordance with a method based on the content of the updating method information.

5. The data processing device according to claim 4, further comprising a fourth updating unit that updates the state of access control to the document to be edited designated by an exclusion removal standby cancellation request from the exclusion removal standby state to the exclusive state in response to the exclusion removal standby cancellation request from the administrator of the document to be edited.

6. A computer-readable recording medium storing a program causing a computer to execute a process, the process comprising:

storing state information indicative of a state of access control to a document to be edited and associated information indicating that the document to be edited is associated with other documents to be edited, the information set up for each document to be edited;

updating the state of access control of the document to be edited to an exclusive state in response to an exclusion request for the document to be edited;

updating the state of access control of the document to be edited from the exclusion removal request to an exclusion removal standby state when the associated information indicates that the document to be edited corresponding to the exclusion removal request is associated with other documents to be edited; and updating the state of access control to all associated documents to be edited from the exclusion removal standby state to an exclusion removal state when the state information of the document to be edited indicates that the document to be edited corresponds to the exclusion removal standby request and the associated information indicates that all the associated documents to be edited correspond to an exclusion removal standby request.

7. A data processing method comprising:

storing state information indicative of a state of access control to a document to be edited and associated information indicating that the document to be edited is associated with other documents to be edited, the information set up for each document to be edited;

updating the state of access control of the document to be edited to an exclusive state in response to an exclusion request for the document to be edited;

updating the state of access control of the document to be edited from the exclusion removal request to an exclusion removal standby state when the associated information indicates that the document to be edited corresponding to the exclusion removal request is associated with other documents to be edited; and updating the state of access control to all associated documents to be edited from the exclusion removal standby state to an exclusion removal state when the state information of the document to be edited indicates that the document to be edited corresponds to the exclusion removal standby request and the associated information indicates that all the associated documents to be edited correspond to an exclusion removal standby request.

* * * * *